Oct. 22, 1968   A. S. GOMEZ   3,406,743
TEMPERATURE AND HUMIDITY CONTROLS FOR A CIGAR VENDING MACHINE
Filed April 10, 1967

INVENTOR
ALVARO S. GOMEZ
BY
Don Finkelstein
ATTORNEY

United States Patent Office 3,406,743
Patented Oct. 22, 1968

3,406,743
TEMPERATURE AND HUMIDITY CONTROLS FOR A CIGAR VENDING MACHINE
Alvaro S. Gomez, Lynwood, Calif.
(1320 Macy St., Los Angeles, Calif. 90033)
Filed Apr. 10, 1967, Ser. No. 629,801
9 Claims. (Cl. 165—12)

ABSTRACT OF THE DISCLOSURE

The environment within a cigar vending machine is carefully controlled with respect to both humidity and temperature so that the cigars are maintained at a correct environment for comparatively extended periods of time. The humidity may be controlled at any percent relative humidity desired and the temperature may be similarly controlled to be greater than, the same as, or less than the ambient temperature. Movable door means located over a water chamber are operated by a humidistat to control the amount of water contacted by the circulating air.

BACKGROUND OF THE INVENTION

*Field of invention*

This invention relates to the vending machine art and more particularly to an improved cigar vending machine in which the environment within the vending machine is maintained at a predetermined condition in order to ensure that the cigars contained therein are also maintained in a predetermined state.

*Description of the prior art*

Vending machines have been utilized in the past for dispensing many commodities as diverse as food and food products, clothing and other elements of apparel, jewelry as well as cigarettes and tobacco products. Most products dispensed by vending machines, however, have not required a complete control of the environment within the machine. That is, such things as ice cream and other frozen products generally only require the maintenance of a frigid or freezing atmosphere within the vending machine. Other food products are either heated especially for each application or only require the particular temperature that is associated with that food product.

Cigars, on the other hand, require a complete control of the environment in which they are stored in order to retain their freshness, fragrance, taste and general character in order to provide the smoker thereof with a truly satisfying and rewarding smoke. Thus, in the vending of a cigar, not only should the temperature within the interior of the vending machine be controlled but also the relative humidity and the freshness of the air, since cigar tobacco will absorb odors and could thus render the cigar useless for providing the comfort and enjoyment anticipated in the smoking of a cigar. To the best of applicant's knowledge, no prior vending machine for cigars has been able to control successfully the total envoirnment in which the cigar is maintained within the machine.

SUMMARY OF THE INVENTION

Applicant provides the above described total environmental control in a cigar vending apparatus by continually monitoring the temperature and the humidity within the vending machine and in response to such measurements of temperature and humidity maintaining the temperature and humidity within a predetermined valve range. The predetermined humidity value range may be other than a 100% saturation point for a particular temperature, which was the only humidity condition that was generally achieved in prior art cigar vending machine wherein there was an attempt to provide a relative humidity within the machine different than the ambient air.

The air within the vending machine is cyclically changed as is the water that is utilized to provide the humidity control. This is done to allow elimination from the interior of the machine any undesirable odors that may have accumulated therein that would adversely affect the flavor and taste of the cigar being vended.

The vending machine mechanism may be of the conventional, coin operated type and the particular type of mechanism utilized with applicant's invention herein does not form a part of applicant's invention. Rather, applicant's invention may be utilized with any conventionally operated mechanism that is adapted to dispense items of a class and nature similar to the shape associated with cigars in various packaging configurations. Thus, the cigars may be individually packaged, may be wrapped or unwrapped, or may be in the form of what has proven to be a commercially acceptable arrangement of a package of five.

Due to the wide selection available in cigar shapes, applicant's invention herein is, of course, adaptable to be utilized with any size or shape cigar as determined by the storage and dispensing mechanism. As noted above, such storage and dispensing mechanism does not form a part of applicant's invention herein, but rather the arrangement for maintaining a predetermined environmental condition within the vending machine wherein the vending machine may be of any design desired is the improvement sought by the application of the principle of applicant's invention herein.

Accordingly, as the object of applicant's invention herein to provide an improved cigar vending machine.

It is another object of applicant's invention herein to provide a cigar vending machine in which the environment which the machine is controlled to a predetermined value regardless of changes in the ambient environment condition.

It is yet another object of applicant's invention herein to provide structure and apparatus for maintaining the environment within a vending machine at a predetermined temperature.

BRIEF DESCRIPTION OF DRAWING

The above and other objects may be more fully understood from the following detailed description taken together with the accompanying drawing wherein similar reference characters referred as similar elements throughout and in which.

DESCRIPTION OF THE PREFERRED EMBODIMENTS

Figure 1:
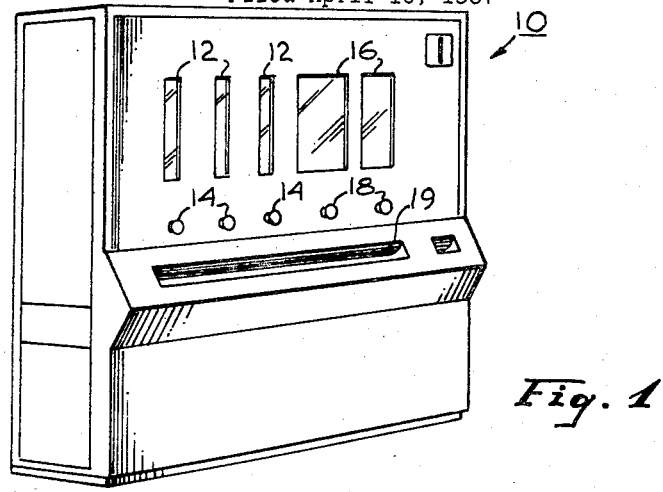
FIGURE 1 illustrates an external view of a coin operated cigar dispensing vending machine embodying applicant's invention herein.

Referring now to the drawing, there is illustrated one embodiment of a vending machine incorporating applicant's invention herein, generally designated 10.

It will be appreciated that by the inclusion of specific references to specific structure, applicant does not intend to limit his invention to the particular details shown but, rather, the details shown illustrate the best mode known to applicant at the present time for taking advantage of his invention. However, variations and adaptations of applicant's inventions falling within the true scope and spirit thereof are intended to be covered by the claims appended thereto.

Vending machine 10 contains therein a plurality of cigars (not shown in FIGURE 1) for dispensing therefrom upon proper operation of the vending machine. The cigars contained within the vending machine 10 may be exemplified by samples 12 shown in viewing windows adjacent to control knobs 14 so that proper selection thereof may be made. The cigars may be individual cigars of different shapes, as shown in window 12 or packaged in groups of multiple cigars such as five in a package as shown in windows 16 controlled by knobs 18, all of which are dispensed in receiving tray 19. It will be appreciated, of course, that the mechanism for coin operation of the vending machine 10 and the apparatus for dispensing these cigars upon proper operating of the vending machine 10 do not form a part of applicant's invention herein.

Figure 2:
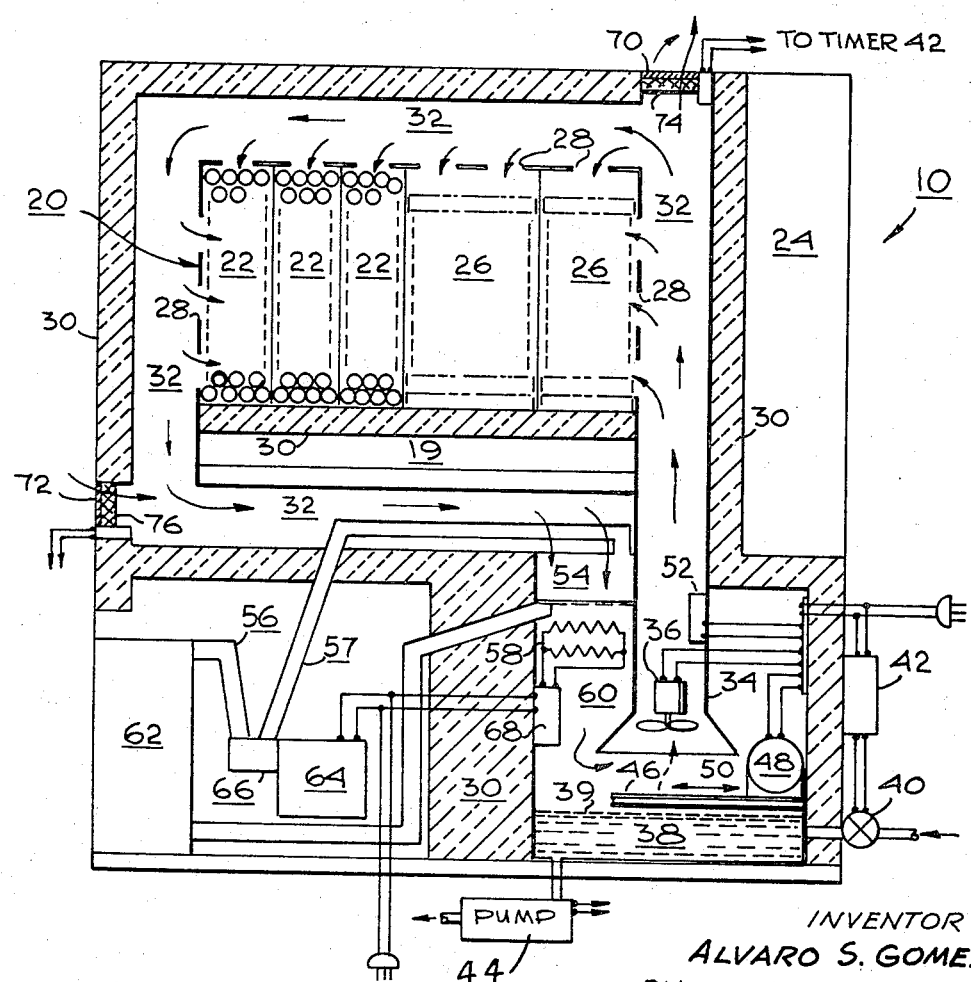
FIGURE 2 is a sectional view of the cigar vending machine illustrated in FIGURE 1 showing detais of the interior construction thereof.

FIGURE 2 illustrates, in semi-schematic representation, the structure associated with applicant's invention for maintaining the environmental condition within the interior of the cigar vending machine 10 at a predetermined condition. In the cigar vending machine 10 there is a cigar storage chamber 20 having a plurality of individual storage bins 22. Cigars, which may be either wrapped or unwrapped or in hard or soft containers, may be stored in the cigar storage bins 22 to be dispensed individually by proper application and operation of the coin actuated vending mechanism generally designated 24. Similarly, the storage bins 26 may be utilized for storing cigars that are packaged in multiple arrangements such as the generally available package of five cigars to be similarly dispensed upon proper operation of the coin operated vending mechanism 24.

The cigars or cigar packages are not packed tightly in the cigar storage bins 22 or 26, but rather are comparatively loosely packed to allow the flow of air therebetween. The chamber 20 has a plurality of openings 28 in the wall thereof to allow the flow of air through the interior cigar storage volume.

The external walls of the vending machine 10 are preferably insulated by insulation 30 which, for example, may be glass fiber insulation or any other desired type of insulation.

Between the insulation 30 and the cigar storage chamber 20 there is provided an air flow passage 32 to allow the flow of air around and through the cigar storage chamber 20. The air enters the air flow passage from a duct 34 in which there is provided positive displacement of the air by a motor-driven fan 36.

The air entering the duct 34 passes over a water supply 38 that may be contained in a water chamber 39. Water chamber 39 may be one that is replenished periodically with fresh water manually or, as shown on FIGURE 2, one in which there is provided an electrically operated valve means 40 operated by timer means 42 and a pump means 44, also operated by timer means 42, so that at set time intervals the timer 42 may be utilized to open the valve 40 and actuate the pump 44 and replenish the water in the water chamber 38 with fresh water from an external water supply.

The water storage chamber 39 may be covered by a movable door 46 that is operated by motor and rack means 48 to slide the door 46 in the directions indicated by the arrow 50 to cover and uncover greater or less portions of water available to the air entering the volume 60 and the duct 34. The motor 48 may be controlled by a humidistat 52 that may be set, for example, to provide a predetermined relative humidity for a predetermined temperature of the air entering the duct 34. If the relative humidity of the air gets above the predetermined value then the door 46 is closed to reduce the amount of water accessible to the air entering the duct 34 until the proper value is maintained for the relative humidity at the given temperature.

If desired, the humidity control of the environment within the vending machine 10 may be provided by a commercially available humidifier such as those manufactured under the tradename Little Giant 19 distributed by Brea Supply Co., Los Angeles, Calif., for example catalog No. 2–HBK. This unit is complete with blower, humidistat, saddle valve, vaporizer and water tank, and accurately controls the humidity of the air to the desired percent relative humidity as set on the humidistat.

The air flows through the duct 32 and in and out of the cigar storage chamber 20 and then passes through an evaporator means 54 of air temperature controls means designated 56. The air also passes over heater coils 58 in entering the volume 60 where it becomes accessible to the water 38 in the water storage chamber 39 before entering the duct 34 that terminates in the volume 60 to draw air therefrom by action of the fan 36.

The air temperature control means 56, which is comprised of the condenser 62, the compressor 64, valve 66 and the evaporator 54 may be of any commercially available type. The air temperature control means 56 and the heater coils 58 may be controlled by a thermostat 68 set for a predetermined temperature and, if the temperature of the air in the chamber 60 falls below the predetermined temperature then the refrigeration unit is turned off and the heater coils 58 are turned on to warm the air to the predetermined value. Similarly, if the temperature of the air in the chamber 64 rises above the predetermined temperature, then the heater coils 58 are turned off and the refrigeration unit 57 is turned on and the air in passing through the evaporator portion 54 of the refrigeration unit 57 is cooled down to the predetermined value.

It will be appreciated that applicant has illustrated his air temperature control means 56 as comprised of the refrigeration unit 57, the heater coils 58 and thermostat 68. These may, of course, be combined into a single air conditioner means to provide all the above mentioned air temperature control functions. Illustration of the separate components has been done to emphasize the functions thereof.

From the structures so far described, it can be seen that applicant's invention provides control of both the temperature and the humidity of the air utilized to surround the quantity of cigars contained within the cigar storage chamber 20. The humidistat 52 allows control of the humidity at any desired relative humidity and not merely at the saturation point for the given temperature. The air temperature control means 56 allows control of the temperature of the air to any desired value. For example, applicant has found that temperature of the air in the range of 45° F. to 65° F. is satisfactory for storage of most cigars and humidity in the range of 60% to 80% relative humidity at temperatures within these temperature ranges is a satisfactory humidity control to maintain the proper moisture content in the air so that the cigars are maintained in a fresh condition.

As noted above, the water 38 in the water chamber 39 may be changed as desired in order to prevent it from becoming stagnant or otherwise introducing objectionable odors into the air passing into the air passageway 32. Since cigars tend to absorb odors from the surrounding air, the presence of objectionable odors therein could decrease the aroma and flavor of a cigar and, in the ultimate, render the cigar unfit to smoke.

In order to ensure that the air surrounding the cigars is maintained in a comparatively clean condition and free of objectionable odors, applicant provides filtered vent means in the preferred embodiment of his invention. The venting of the air in the passage 32 may be achieved, for example, by utilizing one or a plurality of air flow control door means. Thus, as shown on FIGURE 2 there is provided two such air flow control doors, upper air flow control door 70 and lower air flow control door 72. These air flow control doors may be manually openable or may be, as shown on FIGURE 2, electrically actuated by timer 42 so as to periodically open. When the air flow control doors are open the air is exhausted through the port originally covered by air flow control door 70 through a filter screen means 74 and fresh air is drawn into the duct 32 through the screen means 76 adjacent to the air flow control door 72. Thus, the air flow control doors 70 and 72 may be maintained open over any extended period of time, as desired, in order to evacuate any unpleasant odors that may have accumulated in the interior of the vending machine 10. The times at which the air flow control doors 70 and 72 are to be opened, as well as the times at which the water 38 has to be changed, will vary depending upon the particular location of the vending machine 10.

Thus, by insuring that the air not only is maintained within a predetermined temperature range and at a predetermined relative humidity range within this temperature range, but also by making provisions for cleansing the air by means of changing the air in the machine periodically as well as the water in the machine periodically and by filtering the air coming into the machine, applicant has achieved a total environmental control of the environment within the cigar vending machine 10.

Those skilled in the art may find many variations and adaptations of applicant's invention. It will be appreciated that the following claims are intended to cover all such variations and adaptations falling within the true scope and spirit thereof.

All that is claimed as new and desired to be secured by Letters Patent of the United States is:

1. In a cigar vending machine of the type having a plurality of cigars to be vended contained therein and an actuating mechanism for dispensing the cigars on receipt of a proper operation, the improvement comprising, in combination:
    means for controlling the temperature of the air within the machine and surrounding the cigars to be vended with air at a temperature within a predetermined temperature range;
    means for controlling the relative humidity of the air within the machine at a predetermined relative humidity range for air temperatures within said predetermined temperature range, said means for controlling the relative humidity comprising:
        a humidistat for detecting the relative humidity of the air and generating an information signal proportional thereto;
        motor means controlled by said information signal from said humidifier;
        a water storage chamber contained within said machine and positioned adjacent to said means for providing positive air displacement of the air within the machine;
        door means covering said water storage chamber, and said door means operated by said motor means, whereby said humidistat controls the operation of said motor to open and close said door means in response to the information signal generated by said humidistat means;
    means for periodically changing the air contained within the machine;
    means for providing a positive air displacement in predetermined air passages within the machine;
    timer means for generating a control signal at particular time intervals; and
    means for removing the water in said water storage chamber and adding fresh water thereto in response to the said signal generated by said timer means.

2. The arrangement defined in claim 1 wherein:
    said predetermined temperature range is on the order of 45° F. to 65° F., and said predetermined relative humidity range is on the order of 60% to 80%.

3. The arrangement defined in claim 1 wherein said means for providing positive displacement of the air within the machine comprises a motor driven fan means for drawing air over said water storage chamber and into said predetermined air passages surrounding the cigars to be vended.

4. The arrangement defined in claim 3 wherein:
    said predetermined temperature range is on the order of 45° F. to 65° F., and said predetermined relative humidity range is on the order of 60% to 80%.

5. The arrangement defined in claim 1 and further comprising air flow control door means for communicating said air passages with regions external to the machine whereby the air contained within the machine may be periodically evacuated therefrom and fresh air from regions external to the machine drawn therein.

6. The arrangement defined in claim 5 wherein:
    said predetermined temperature range is on the order of 45° F. to 65° F., and said predetermined relative humidity range is on the order of 60% to 80%.

7. The arrangement defined in claim 1 wherein said means for controlling the temperature of said air comprises:
    thermostat means for detecting the temperature of the air within the machine and generating a control signal in response thereto;
    refrigeration means for receiving said control signal and for cooling the air in response to said signal for the condition of the temperature of said air greater than the predetermined temperature range;
    heater coil means controlled by said thermostat for heating said air for the condition of the temperature of the air within the machine less than the predetermined temperature range.

8. The arrangement defined in claim 7 and further comprising,
    air flow control door means for communicating said air passages with regions external to the machine whereby the air contained within the machine may be periodically evacuated therefrom and fresh air from regions external to the machine drawn therein.

9. The arrangement defined in claim 8 wherein:
    said predetermined temperature range is on the order of 45° F. to 65° F., and said predetermined relative humidity range is on the order of 60% to 80%.

References Cited

UNITED STATES PATENTS

| | | | |
|---|---|---|---|
| 2,442,871 | 6/1948 | Friedrich | 236—46 |
| 3,073,127 | 1/1963 | Schmerzler | 62—3 |
| 3,171,473 | 3/1965 | Lawler | 165—21 |
| 3,245,461 | 4/1966 | Allington | 165—21 |
| 3,263,737 | 8/1966 | Brummendorf | 165—20 XR |

ROBERT A. O'LEARY, *Primary Examiner.*

M. A. ANTONAKAS, *Assistant Examiner.*